US012715584B2

(12) United States Patent
Hoskote Hanumantha Rao et al.

(10) Patent No.: US 12,715,584 B2
(45) Date of Patent: Aug. 25, 2026

(54) FULLY AUTOMATIC AUXILIARY RESTRAINT FOR CARGO SYSTEM

(71) Applicant: Goodrich Corporation, Charlotte, NC (US)

(72) Inventors: Bhargav Hoskote Hanumantha Rao, Bangalore (IN); Sayooj Adavalath Puthiyaveettil, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 481 days.

(21) Appl. No.: 18/112,626

(22) Filed: Feb. 22, 2023

(65) Prior Publication Data

US 2024/0190569 A1 Jun. 13, 2024

(30) Foreign Application Priority Data

Dec. 9, 2022 (IN) ............................. 202241071145

(51) Int. Cl.
*B64D 9/00* (2006.01)

(52) U.S. Cl.
CPC ........ *B64D 9/003* (2013.01); *B64D 2009/006* (2013.01)

(58) Field of Classification Search
CPC .. B60P 7/0892; B60P 7/10; B60P 7/13; B60P 7/135; B64D 9/003; B64D 2009/006
USPC .................................. 410/92, 94–95, 77–80
See application file for complete search history.

(56) References Cited

U.S. PATENT DOCUMENTS

| | | | | |
|---|---|---|---|---|
| 3,251,489 A * | 5/1966 | Davidson | B60P 7/13 410/79 |
| 3,612,316 A * | 10/1971 | Baldwin | B64D 9/003 244/137.3 |
| 7,922,431 B2 * | 4/2011 | Schulze | B64D 9/003 410/80 |
| 10,392,111 B2 | 8/2019 | Jayaprakash et al. | |
| 10,556,683 B2 | 2/2020 | Bogar et al. | |
| 10,797,260 B2 | 10/2020 | Xie et al. | |
| 10,814,982 B2 | 10/2020 | Brown et al. | |
| 2004/0218989 A1 * | 11/2004 | Huber | B64C 1/20 410/92 |
| 2004/0265085 A1 | 12/2004 | Mayer et al. | |
| 2019/0009999 A1 | 1/2019 | Schlintz et al. | |
| 2019/0248269 A1 | 8/2019 | Shivalinga et al. | |

OTHER PUBLICATIONS

European Patent Office, European Search Report dated May 7, 2024 in Application No. 23215374.2.
European Patent Office, European Office Action dated Oct. 14, 2025 in Application No. 23215374.2.

* cited by examiner

*Primary Examiner* — Stephen T Gordon
(74) *Attorney, Agent, or Firm* — SNELL & WILMER L.L.P.

(57) ABSTRACT

A cargo handling system is disclosed herein. The cargo handling system includes a ball panel for moving and storing cargo and a cargo restraining device disposed within the ball panel. The cargo restraining device includes a base, a restraint head having a gear assembly and secured to the base by a shaft coupled to the gear assembly, a motor coupled to the base, and a worm gear assembly coupled to the motor and the gear assembly, the worm gear assembly configured to engage the gear assembly to extend and retract the restraint head.

15 Claims, 10 Drawing Sheets

FULLY AUTOMATIC AUXILIARY RESTRAINT FOR CARGO SYSTEM

CROSS-REFERENCE TO RELATED APPLICATIONS

This application claims priority to, and the benefit of, India Patent Application No. 202241071145 (DAS CODE: 2C4F), filed Dec. 9, 2022 and titled "FULLY AUTOMATIC AUXILIARY RESTRAINT FOR CARGO SYSTEM," which is incorporated by reference herein in its entirety for all purposes.

FIELD

The present disclosure generally relates cargo restraining assemblies, and more specifically, to auxiliary cargo restraining assemblies.

BACKGROUND

Auxiliary restraint assemblies are used in air cargo compartments with the cargo surface, such as a ball panel, near the cargo loading door of an aircraft. Cargo loaded into the cargo compartment of an aircraft is secured to the aircraft using straps, webbing, or other mechanisms. The final pieces of cargo loaded into the cargo compartment are secured near the cargo loading door. Auxiliary restraint assemblies provide a lateral locking for the cargo near the cargo loading door.

SUMMARY

Disclosed herein is a cargo handling system. The cargo handling system includes a ball panel for moving and storing cargo and a cargo restraining device disposed within the ball panel. The cargo restraining device includes a base, a restraint head having a gear assembly and secured to the base by a shaft coupled to the gear assembly, a motor coupled to the base, and a worm gear assembly coupled to the motor and the gear assembly, the worm gear assembly configured to engage the gear assembly to extend and retract the restraint head.

In various embodiments, the cargo restraining device further includes a lock pin assembly coupled to the base, wherein a first end of the worm gear assembly is coupled to the lock pin assembly and a second end of the worm gear assembly is coupled to the motor. In various embodiments, the cargo restraining device further includes a motor shaft assembly coupled to the base, wherein the motor is coupled to the motor shaft assembly and a shaft coupler, a first end of the shaft coupler coupled to the motor and a second end of the shaft coupler coupled to the worm gear assembly. In various embodiments, the worm gear assembly includes a worm gear and a shaft, the gear assembly to the worm gear ratio being between 1:20 and 1:300.

In various embodiments, the cargo handling system further includes a controller configured to control a rotation of the motor. In various embodiments, the restraint head extends in response to the motor rotating counterclockwise and the restraint head retracts in response to the motor rotating clockwise. In various embodiments, the worm gear assembly includes:

- a drive shaft having a first end and a second end, a worm gear coupled to the drive shaft between the first end and the second end, and a D coupling at the second end of the drive shaft, the D coupling configured to be engaged by the motor. In various embodiments, the gear assembly and the worm gear assembly are configured to be right-hand worm arrangement.

Also disclosed herein is a cargo restraining device, including a base, a restraint head having a gear assembly and secured to the base by a shaft coupled to the gear assembly, a motor coupled to the base, and a worm gear assembly coupled to the motor and the gear assembly, the worm gear assembly configured to engage the gear assembly to extend and retract the restraint head.

In various embodiments, the cargo restraining device further includes a lock pin assembly coupled to the base, wherein a first end of the worm gear assembly is coupled to the lock pin assembly and a second end of the worm gear assembly is coupled to the motor. In various embodiments, the cargo restraining device further includes a motor shaft assembly coupled to the base, wherein the motor is coupled to the motor shaft assembly and a shaft coupler, a first end of the shaft coupler coupled to the motor and a second end of the shaft coupler coupled to the worm gear assembly.

In various embodiments, the worm gear assembly includes a worm gear and a shaft, the gear assembly to the worm gear ratio being between 1:50 and 1:250. In various embodiments, the motor is configured to be controlled by a controller. In various embodiments, the restraint head extends in response to the motor rotating counterclockwise and the restraint head retracts in response to the motor rotating clockwise. In various embodiments, the worm gear assembly includes a drive shaft having a first end and a second end, a worm gear coupled to the drive shaft between the first end and the second end, and a D coupling at the second end of the drive shaft, the D coupling configured to be engaged by the motor.

Also disclosed herein is a system, including a motor, a worm gear assembly coupled to the motor, a restraint head assembly including a gear, the gear coupled to the worm gear assembly, a processor, and a memory operatively coupled to the processor. The memory includes instructions stored thereon that, when executed by the processor, cause the processor send a first current to the motor to rotate in a first direction to extend the restraint head assembly and stop the first current to the motor in response to the motor rotating a first number of rotations, locking the restraint head assembly in an extended position.

In various embodiments, the instructions, when executed by the processor, further cause the processor to receive a first instruction indicating the first number of rotations and send the first current in response to receiving the first instruction. In various embodiments, the instructions, when executed by the processor, further cause the processor to send a second current that is opposite the first current to the motor to rotate in a second direction that is opposite the first direction to retract the restraint head assembly and stop the second current to the motor in response to the motor rotating the first number of rotations.

In various embodiments, the system further includes a speed controller in communication with the processor, wherein the instructions, when executed by the processor, further cause the processor to send a second instruction to the speed controller, the speed controller sending the first current to the in response to receiving the second instruction. In various embodiments, the system further includes a motor adapter in communication with the speed controller, wherein the instructions, when executed by the processor, further cause the processor to send a second instruction to the motor adapter, the motor adapter sending the first current to the motor in response to receiving the second instruction.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is an auxiliary restraint assembly for use in a cargo compartment, such as in an aircraft. The auxiliary restraint assembly disclosed herein, in various embodiments, improves and simplifies existing designs. The auxiliary restraint includes a worm gear and a wheel mechanism operated by a motor, all of which fits within current space constraints. In various embodiments, the motor may be a servo motor. The worm gear may be coupled to restraint head assembly. The worm wheel assembly is coupled to the motor via a drive shaft. The motor turns the drive shaft, turning the worm shaft assembly, causing the worm gear to rotate to raise, or lower, the restraint head assembly. In various embodiments, the motor is coupled to the drive shaft using a shaft coupler. In various embodiments, two side plates are assembled to restrain the restraint head assembly and provide a frame for the auxiliary restraint.

The auxiliary restraint assembly disclosed herein uses fewer components that current designs. In various embodiments, the auxiliary restraint assembly disclosed herein may be fully automated. In various embodiments, the auxiliary restraint assembly disclosed herein may be a drop-in replacement for existing manual auxiliary restraint assemblies. In various embodiments, the auxiliary restraint assembly disclosed herein may be integrated with other smart cargo compartment features.

Figure 1:
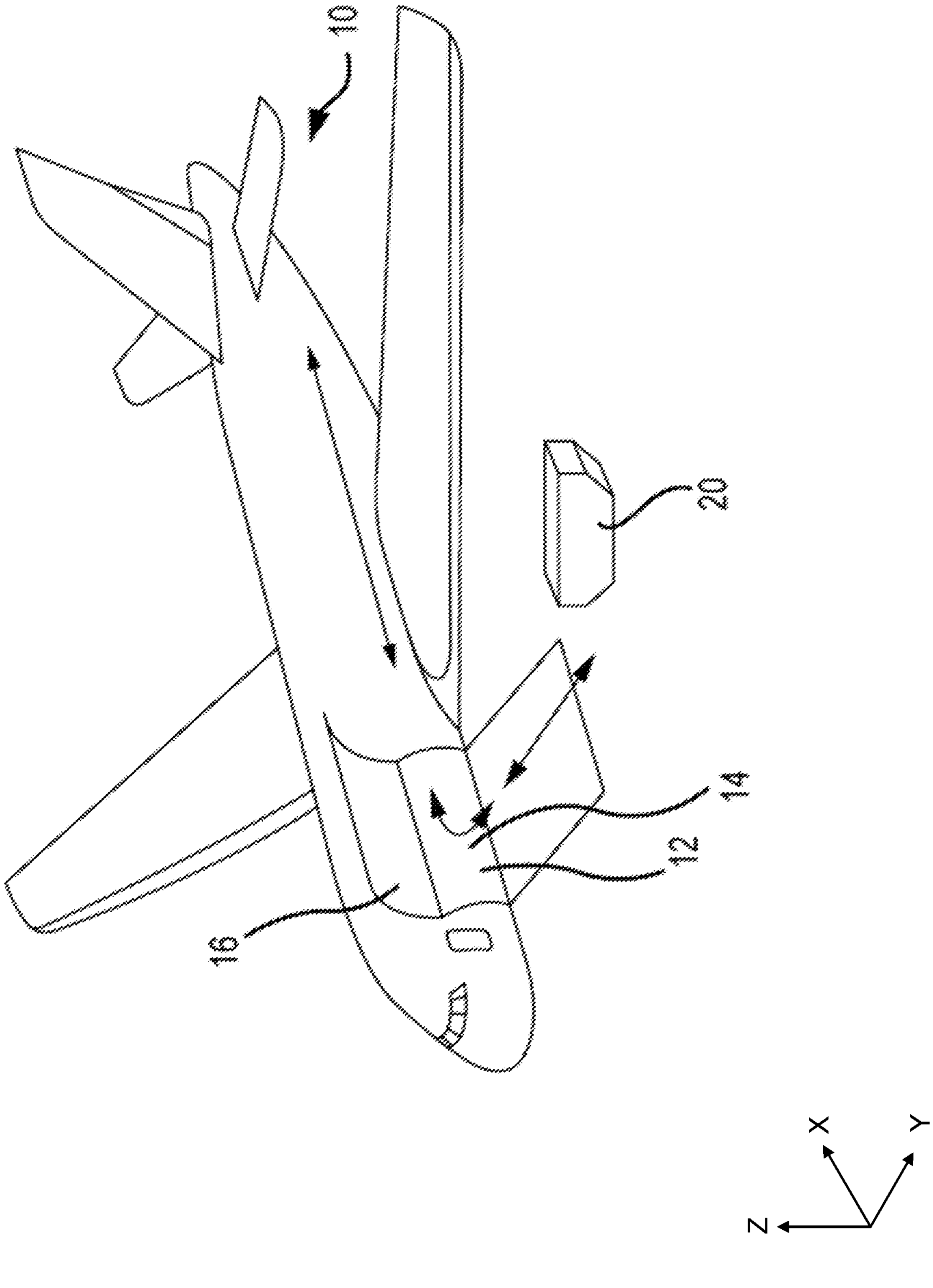
FIG. 1 illustrates a schematic of an aircraft being loaded with cargo, in accordance with various embodiments.

Referring now to FIG. 1, in accordance with various embodiments, a perspective view of an aircraft 10 is illustrated. Aircraft 10 includes a cargo deck 12 located within a cargo compartment 14. Aircraft 10 may comprise a cargo load door 16 located, for example, at one side of a fuselage structure of aircraft 10. A unit load device (ULD) 20, in the form of a container or pallet, for example, may be loaded through cargo load door 16 and onto cargo deck 12 of aircraft 10 or, conversely, unloaded from cargo deck 12 of aircraft 10. A "ULD", as used herein, includes a container, pallet, or other cargo of any size, shape, configuration, and/or type. In general, ULDs are available in various sizes and capacities, and are typically standardized in dimension and shape. Once loaded with items destined for shipment, ULD 20 is transferred to aircraft 10 and then loaded onto aircraft 10 through cargo load door 16 using a conveyor ramp, scissor lift or the like. As illustrated, ULD 20 is loaded laterally (e.g., the negative y-direction) into cargo compartment 14. Once inside aircraft 10, ULD 20 may be moved longitudinally (e.g., the x-direction) cargo compartment 14 to a final stowed position. Straps may be used to secure ULD 20 in the final stowed position to minimize, or prevent, movement of ULD 20 during transport. Multiple ULDs may be brought on-board aircraft 10, with each ULD 20 being placed in a respective stowed position on cargo deck 12. One or more final ULDs 20 may be loaded laterally into cargo compartment 14 but not moved longitudinally within cargo compartment 14. After aircraft 10 has reached its destination, each ULD 20 is unloaded from aircraft 10 in similar fashion, but in reverse sequence to the loading procedure. To facilitate movement of ULD 20 along the cargo deck 12, aircraft 10 may include a cargo handling system as described herein in accordance with various embodiments.

Figure 2A:
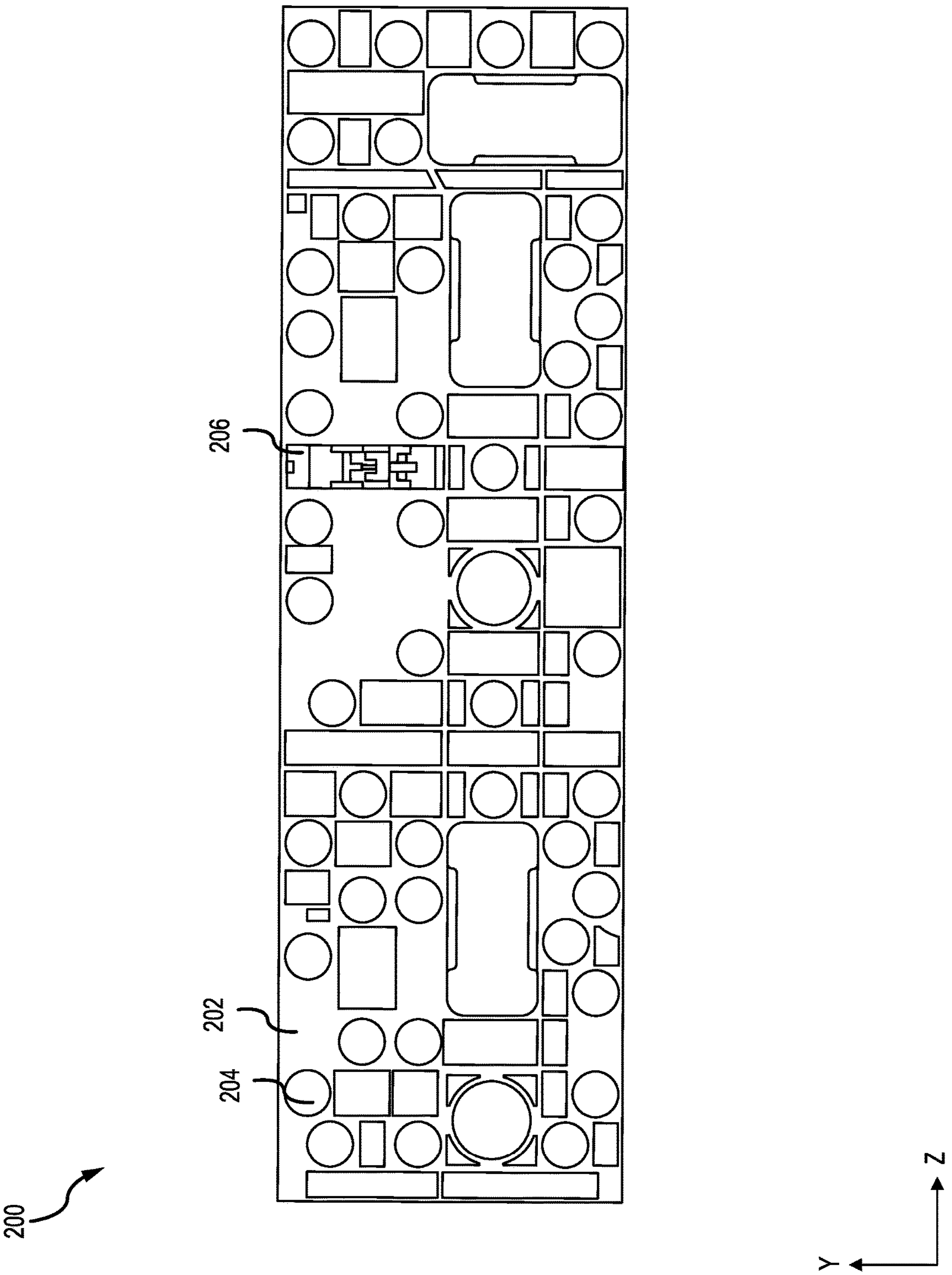
FIGS. 2A, 2B, and 2C illustrate a cargo handling system including a cargo restraining device, in accordance with various embodiments.
Figure 2C:
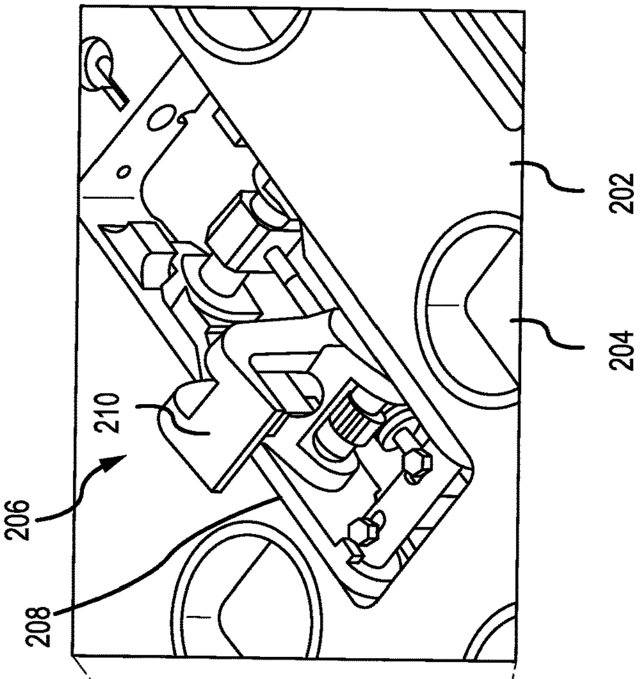
Figure 2B:
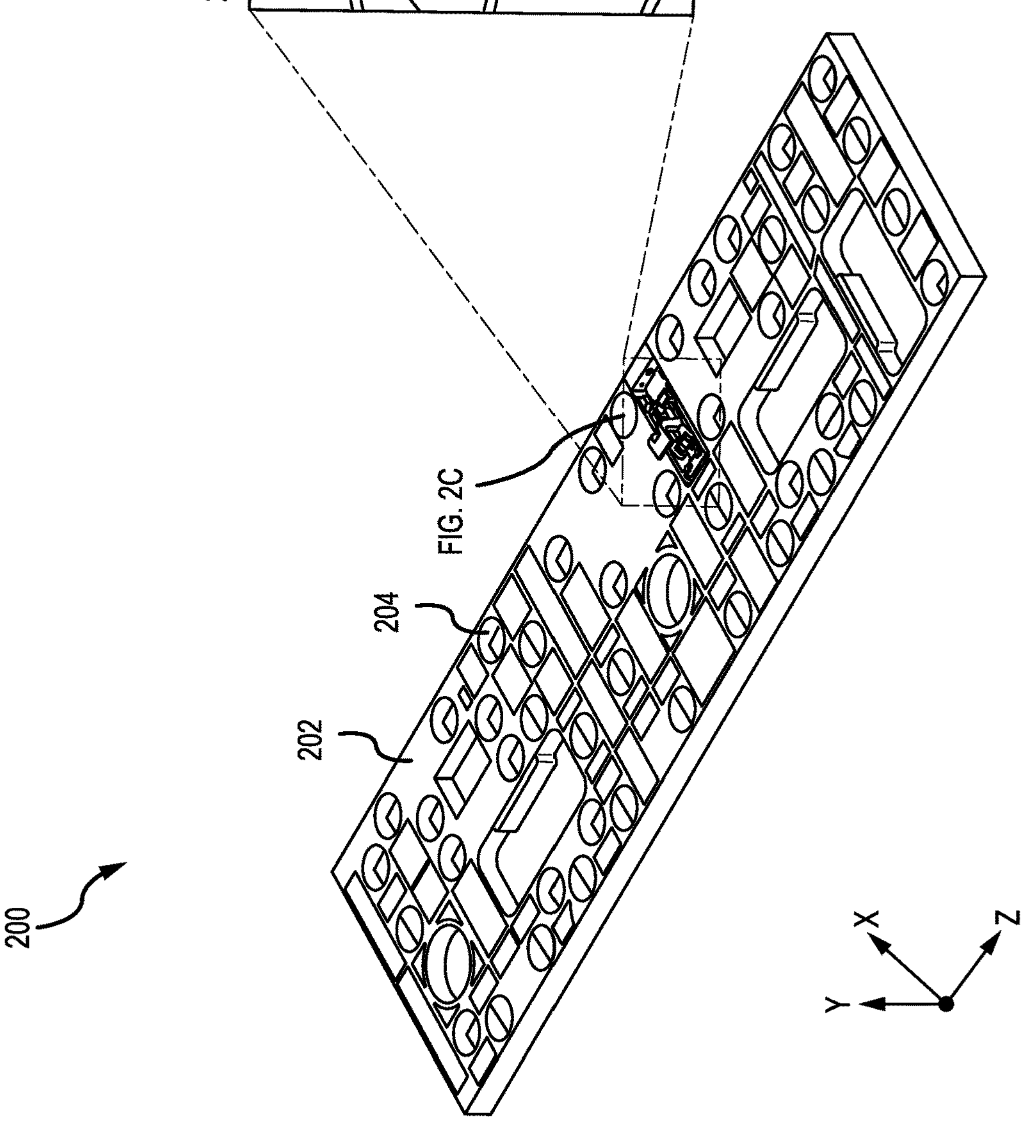

Referring now to FIGS. 2A-2C, in accordance with various embodiments, a cargo handling system 200 is illustrated. FIG. 2A is a top-down view of cargo handling system 200 and FIGS. 2B and 2C are perspective views of cargo handling system 200. Cargo handling system 200 includes a ball panel 202 having a plurality of omni-directional rollers 204 and one or more cargo restraining devices 206. Ball panel 202 may be located in cargo compartment 14, such as within the opening created by cargo load door 16. Ball panel 202 is configured to load/unload the cargo (e.g., ULD 20) laterally within aircraft 10 (e.g., the negative y-direction) and move the cargo (e.g., ULD 20) longitudinally (e.g., the x-direction) within cargo compartment 14. Omni-directional roller 204 allow the cargo to move both laterally and longitudinally. In various embodiments, cargo handling system 200 may further include one or more power drive units (PDUs) configured to move the cargo along ball panel 202. For example, one or more PDUs may be configured to move the cargo laterally along ball panel 202 and one or more different PDUs may be configured to move the cargo longitudinally over ball panel 202.

Cargo restraining device 206 may include a base 208, also referred to as a frame, and a restraint head assembly 210. Cargo restraining device 206 is configured to retract (i.e., fold restraint head assembly 210 into base 208) and extend (i.e., deploy restraint head assembly 210 from base 208). When in a retracted state, as illustrated in FIG. 2A, cargo restraining device 206 is below (i.e., in the negative z direction) the surface of ball panel 202, and more specifically, omni-directional roller 204 allowing cargo (e.g., ULD 20) to move across ball panel 202. In response to being extended, as illustrated in FIGS. 2B and 2C, cargo restraining device 206 is configured to restrain the cargo from moving in a specific direction (e.g., the positive y-direction). In various embodiments, cargo restraining device 206 is used as a backup restraining device to the straps that are used to restrain the cargo. In various embodiments, cargo restraining device 206 may be deployed near cargo load door 16 to prevent cargo (e.g., ULD 20) from moving toward cargo load door 16 in the event that the cargo shifts during transport.

Figure 3B:
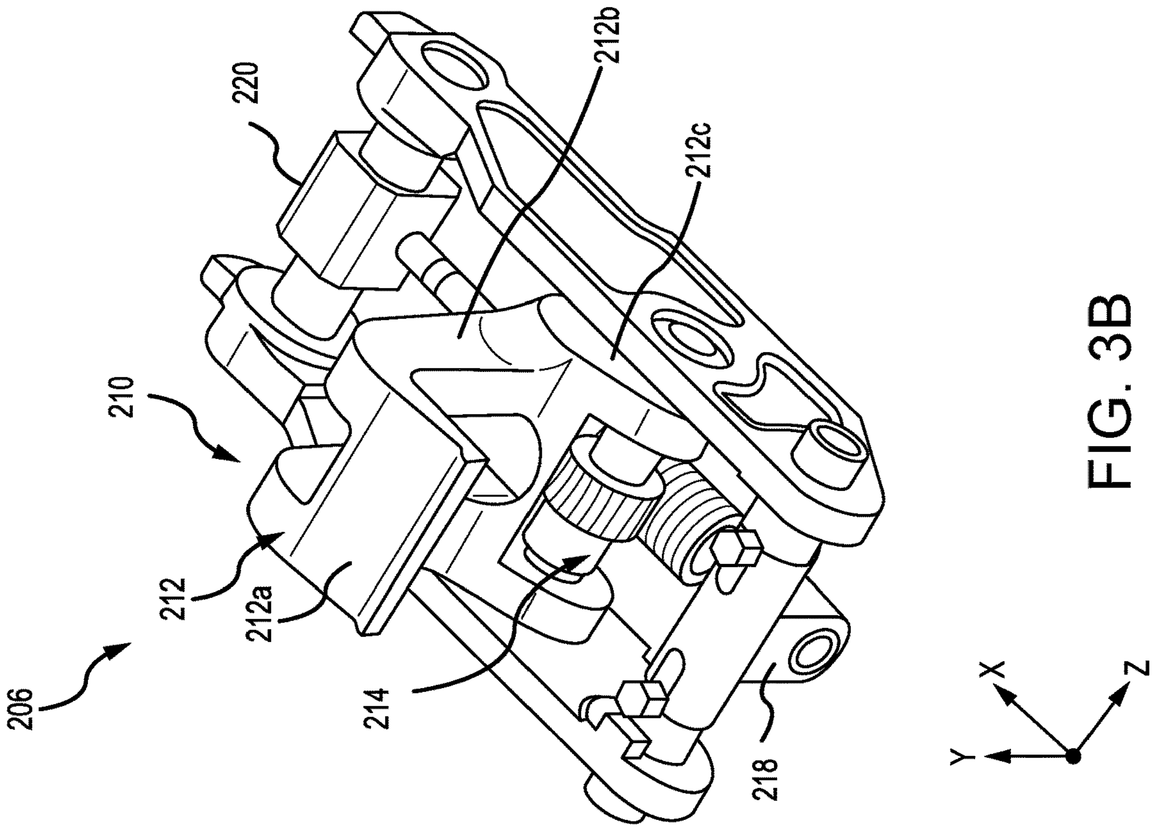
FIGS. 3A and 3B illustrate a cargo restraining device, in accordance with various embodiments.
Figure 3A:
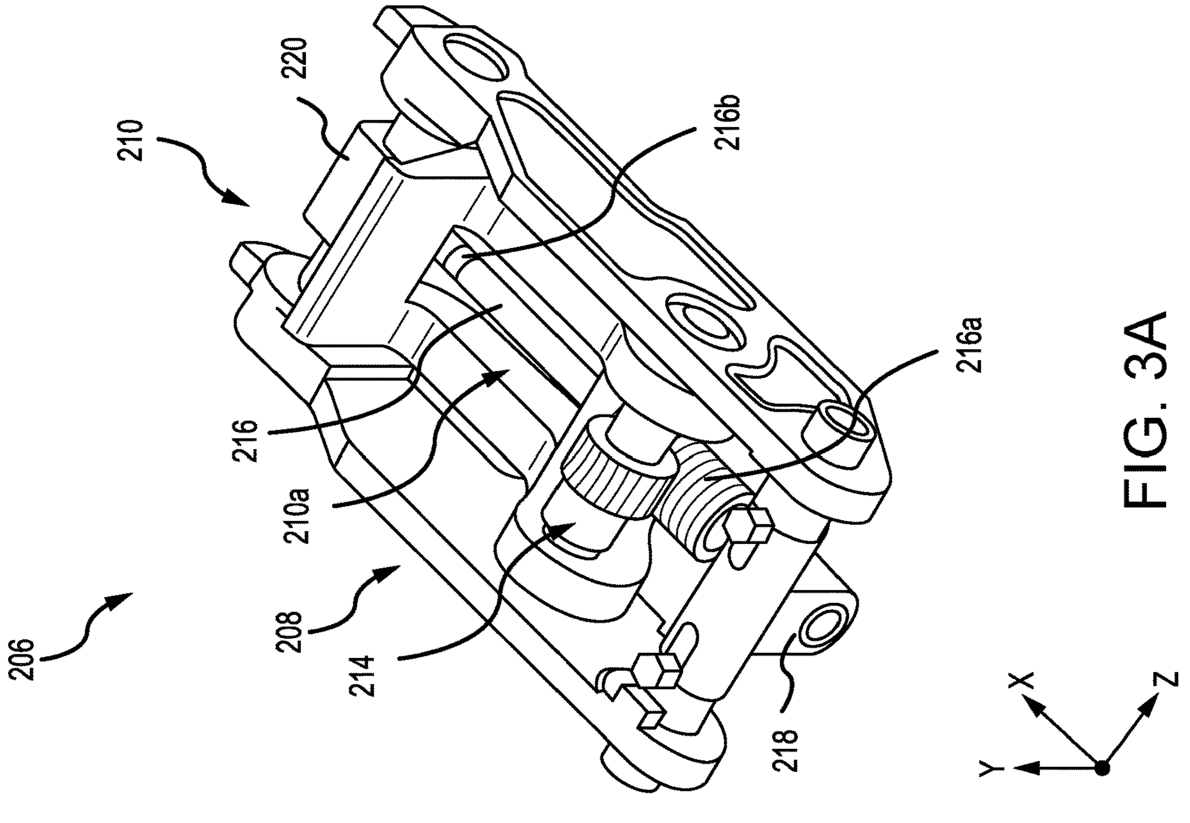

Referring now to FIGS. 3A and 3B, illustrated are isometric views of a cargo restraining device 206, in accordance with various embodiments. FIG. 3A illustrates cargo restraining device 206 in a retracted, or disengaged, position (e.g., restraint head assembly 210 folded into base 208). FIG. 3B illustrates cargo restraining device 206 in an extended, or engaged, position (e.g., restraint head assembly 210 deployed from base 208). Restraint head assembly 210 includes a restraint head 212 having a horizontal portion 212*a*, vertical portions 212*b*, and a base portion 212*c*. Horizontal portion 212*a* extends orthogonally from the vertical portion 212*b* creating an inverted L-shape. Horizontal portion 212*a* is configured to engage the cargo (e.g., ULD 20, sidewall of cargo, etc.) to prevent the cargo from moving. Vertical portions 212*b* form a space 210*a* in restraint head assembly 210.

Cargo restraining device 206 further includes a head cam gear assembly 214, a worm shaft assembly 216, a lock pin assembly 218, and a motor shaft assembly 220. Head cam gear assembly 214 is coupled to restraint head assembly 210 and base 208. Worm shaft assembly 216 interfaces with head cam gear assembly 214 and rotates to move restraint head assembly 210 between the retracted and extended positions. Lock pin assembly 218 is assembled to base 208 and interfaces with a first end 216*a* of worm shaft assembly 216. Motor shaft assembly 220 is assembled to base 208 and interfaces with a second end 216*b* of worm shaft assembly 216. Motor shaft assembly 220 drives worm shaft assembly 216, rotating worm shaft assembly 216 in a clockwise or counterclockwise direction. In the retracted position, worm shaft assembly 216 fits within space 210*a* in restraint head assembly 210.

Figure 4A:
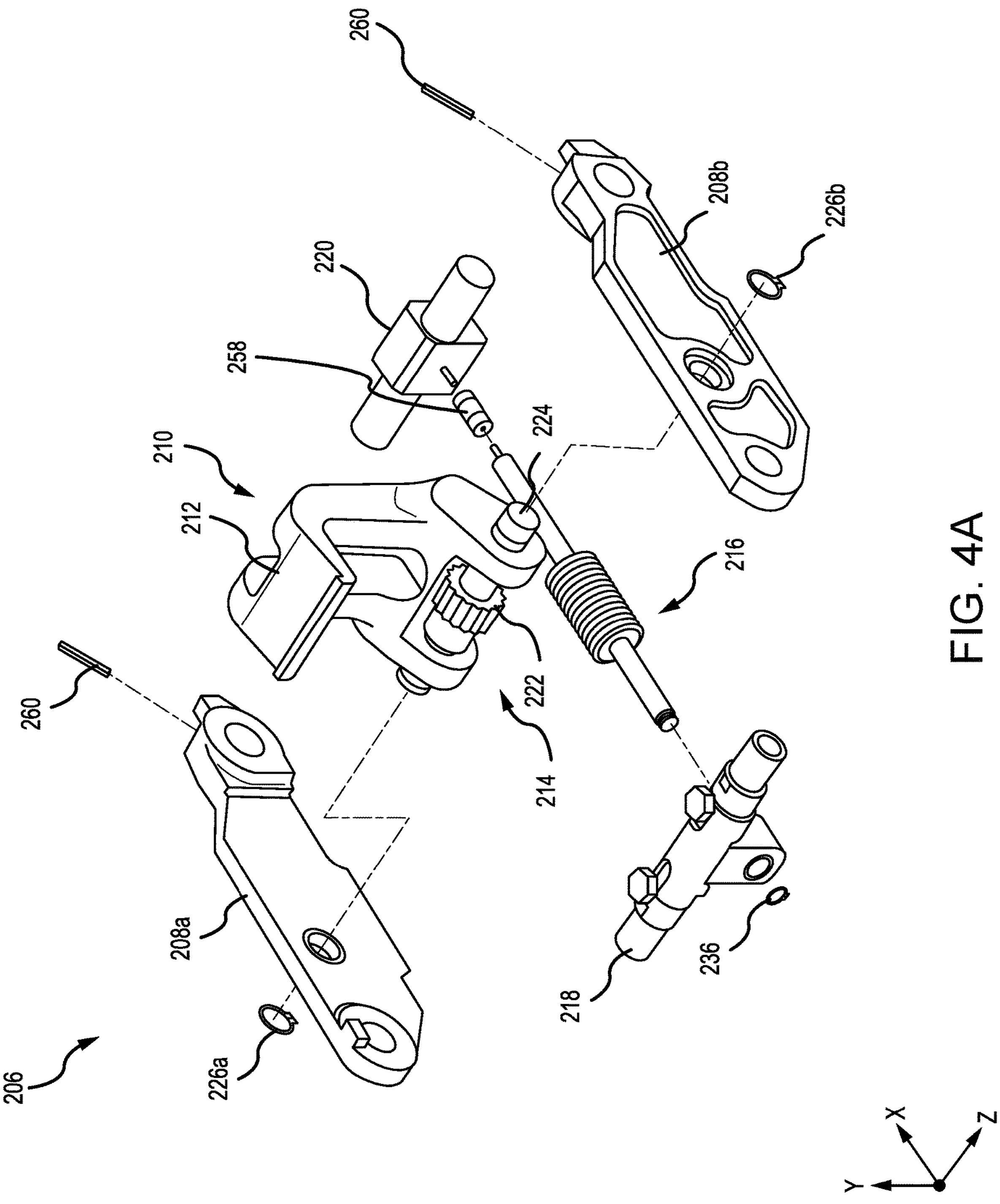
FIGS. 4A, 4B, 4C, 4D, 4E, 4F, 4G, 4H, and 4I illustrate components of a cargo restraining device, in accordance with various embodiments.
Figure 4C:
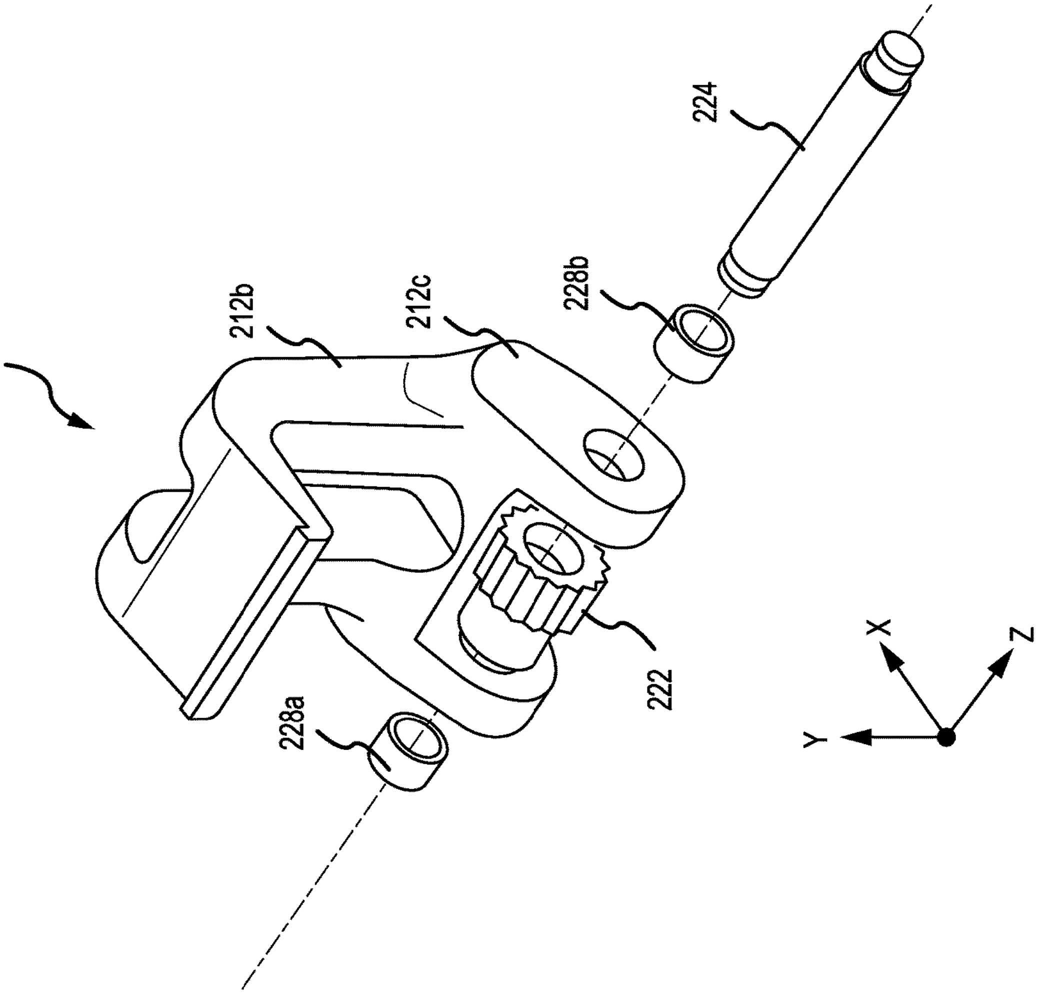
Figure 4B:
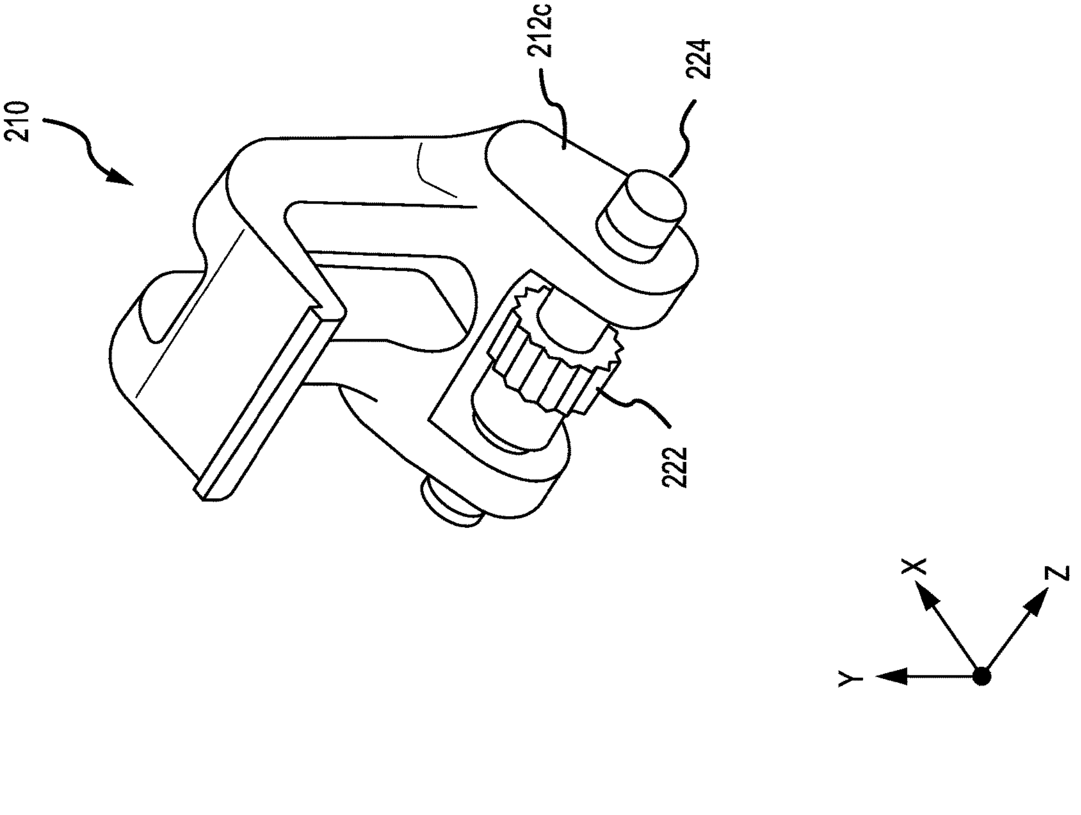
Figure 4E:
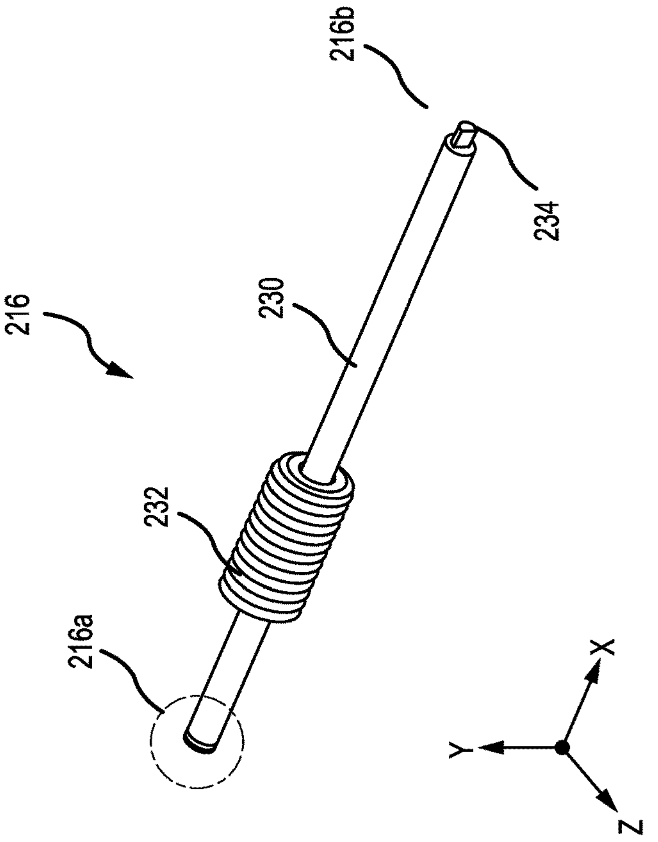
Figure 4D:
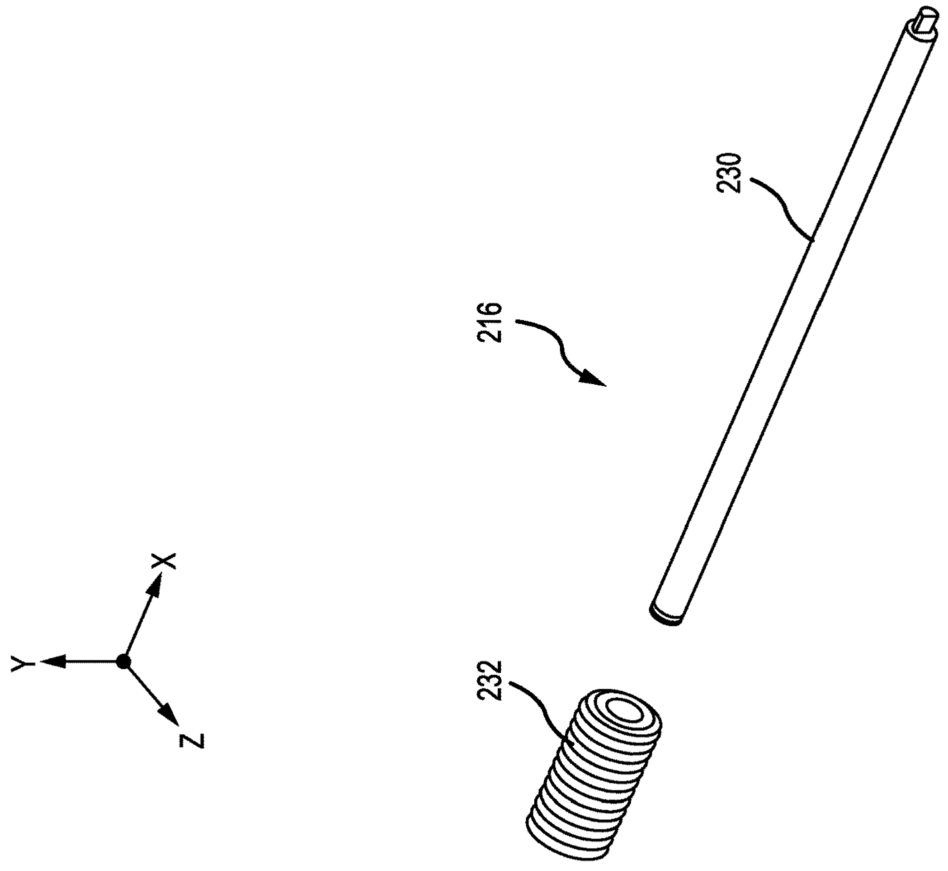
Figure 4F:
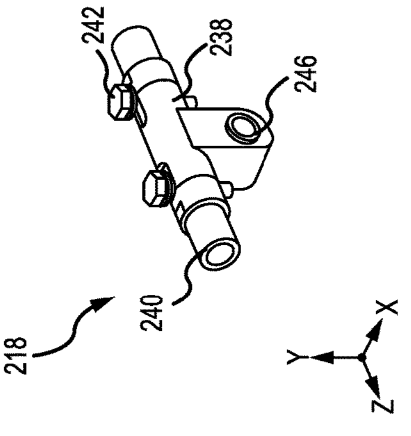
Figure 4G:
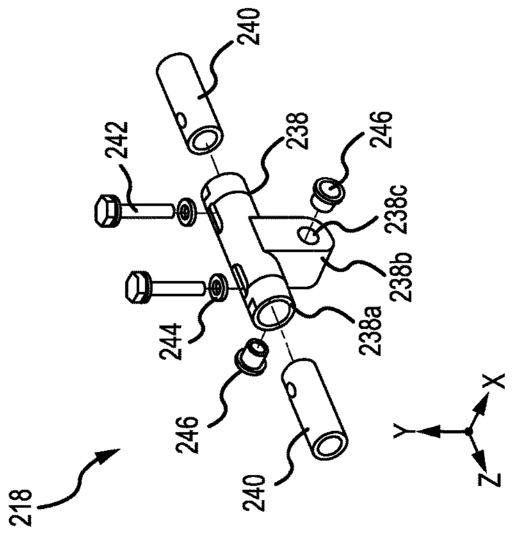
Figure 4H:
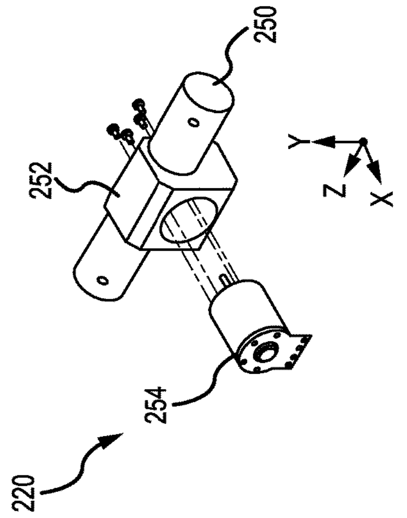
Figure 4I:
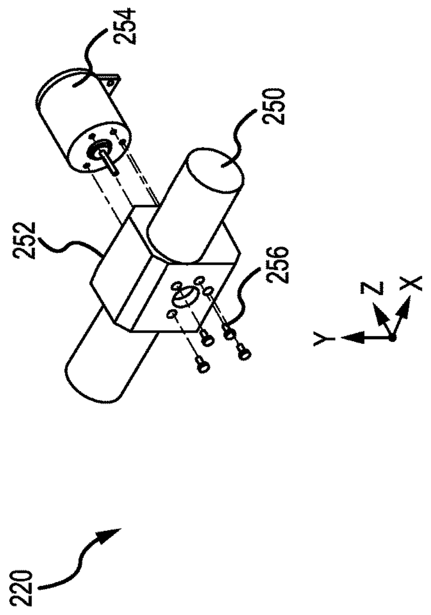

Referring now to FIGS. 4A-4I, illustrated are exploded isometric views of cargo restraining device 206 and its various components, in accordance with various embodiments. FIG. 4A illustrates an exploded perspective view of cargo restraining device 206 is illustrated. FIGS. 4B and 4C illustrate assembled and exploded perspective views, respectively, of restraint head assembly 210 and head cam gear assembly 214. FIGS. 4D and 4E illustrate assembled and exploded views, respectively, of worm shaft assembly 216. FIGS. 4F and 4G illustrate assembled and exploded views, respectively, of lock pin assembly 218. FIGS. 4H and 4I illustrate assembled and exploded views, respectively, of motor shaft assembly 220.

Referring now to FIGS. 4A, 4B, and 4C, head cam gear assembly 214 includes a cam gear 222, a shaft 224, a first bushing 228*a*, a second bushing 228*b*, a first retainer ring 226*a*, and a second retainer ring 226*b*. Restraint head assembly 210 and head cam gear assembly 214 are assembled by inserting first bushing 228*a* into a first leg of base portion 212*c* and second bushing 228*b* into a second leg of base portion 212*c*. In various embodiments, bushings 228*a*, 228*b* are press fit into legs of base portion 212*c* of restraint head assembly 210. Cam gear 222 is placed between legs of base portion 212*c* of restraint head assembly 210 and shaft 224 is passed through second bushing 228*b*, cam gear 222, and first bushing 228*a*. The ends of shaft 224 are inserted into base 208, specifically side plate 208*a* and side plate 208*b*. In various embodiments, shaft 224 is press fit into bushings 228*a*, 228*b*. First retainer ring 226*a* is coupled to a first end of shaft 224, securing shaft 224 to first side plate 208*a*. Second retainer ring 226*b* is coupled to a second end of shaft 224, securing shaft 224 to second side plate 208*b*.

Referring now to FIGS. 4A, 4D, and 4E, worm shaft assembly 216 includes a drive shaft 230 and a worm gear 232 through which drive shaft 230 passes. Drive shaft 230 has a first end 216*a* and a second end 216*b*. First end 216*a* of drive shaft 230 is coupled to lock pin assembly 218 by a third retainer ring 236. Second end 216*b* of drive shaft 230 includes a D coupling end 234 having a flat surface and a rounded surface, as illustrated. Motor shaft assembly 220 engages D coupling end 234 to rotate worm shaft assembly 216. worm shaft assembly 216 shifts the angle of rotation by 90 degrees in a same plane to engage head cam gear assembly 214 and rotate restraint head assembly 210.

Referring now to FIGS. 4A, 4F, and 4G, lock pin assembly 218 includes a shaft retainer 238, sliding pins 240, screws 242, washers 244, and bushings 246. Shaft retainer 238 includes a horizontal piece 238*a* (e.g., the Z direction) that is coupled to a vertical piece 238*b* (e.g., the Y direction) that includes a hole 238*c* passing therethrough. Sliding pins 240 are inserted into either end of horizontal piece 238*a* and secured into place by screws 242 and washers 244. Bushings 246 are inserted into either end of hole 238*c* in vertical piece 238*b*.

Referring now to FIGS. 4A, 4H, and 4I, motor shaft assembly 220 includes a motor shaft 250, a motor shaft housing 252, a motor 254, screws 256, and shaft coupler 258. Motor shaft 250 is orthogonally coupled to motor shaft housing 252 (e.g., the X direction). Motor 254 is coupled orthogonally to motor shaft housing 252 and motor shaft 250 (e.g., the Z direction) using screws 256. In various embodiments, screws 256 may be countersunk into motor shaft housing 252. Shaft coupler 258 is coupled at one end to motor 254, through motor shaft housing 252, and at the other end to worm shaft assembly 216, and more specifically, to second end 216*b* of drive shaft 230. Shaft coupler 258 engages D coupling end 234 to rotate drive shaft 230 clockwise and counterclockwise.

First end 216*a* of worm shaft assembly 216, and more specifically, drive shaft 230 is passed through bushings 246 of shaft retainer 238 of lock pin assembly 218. Second end 216*b* of worm shaft assembly 216, and more specifically, drive shaft 230 is coupled to shaft coupler 258 of motor shaft assembly 220. Movement of the worm shaft assembly 216 is locked along an axis (e.g., the X axis) using third retainer ring 236. Restraint head assembly 210 including head cam gear assembly 214 engages worm gear 232 of worm shaft assembly 216. Side plates 208*a*, 208*b* are aligned to restraint head assembly 210, head cam gear assembly 214, lock pin assembly 218, and motor shaft assembly 220. Shaft 224 is secured to side plates 208*a*, 208*b* using first retainer ring 226*a* and second retainer ring 226*b*, respectively. Motor shaft assembly 220 is secured to side plates 208*a*, 208*b* using spring pins 260 that are inserted through side plates 208*a*, 208*b* and into motor shaft 250. Sliding pins 240 of lock pin assembly 218 slide through holes in side plates 208*a*, 208*b* to lock with ball panel 202.

In various embodiments, head cam gear assembly 214 and worm shaft assembly 216 are configured in a right-hand worm arrangement. That is, motor 254 rotates worm shaft assembly 216 in a counterclockwise direction to raise, or engage, restraint head assembly 210 and rotates worm shaft assembly 216 in a clockwise direction to lower, or disengage, restraint head assembly 210. In this right-hand worm arrangement, it is difficult to impossible to cause rotation of worm shaft assembly 216 by applying a force to restraint head assembly 210. In this way, head cam gear assembly 214 and worm shaft assembly 216 additionally function as a lock to secure restraint head assembly 210 in the engaged, or raised, position.

In various embodiments, the worm gear 232 to cam gear 222 may have a speed reduction ratio to reduce the size of motor 254. In various embodiments, the worm gear 232 to cam gear 222 ratio may be from about 1:20 to about 1:300, and more specifically from about 1:50 to about 1:250, and more specifically about 1:150. In various embodiments, the ratio may be higher or lower based on the size of motor 254. Motor selection may be made using the gear ratio and a torque value to raise and lower restraint head assembly 210. That is, a lower gear ratio may be paired with a larger motor and a higher hear ratio may be paired with a smaller motor. In various embodiments, the speed at which motor 254 raises and lowers restraint head assembly 210 may be considered in selecting motor 254.

Figure 5C:
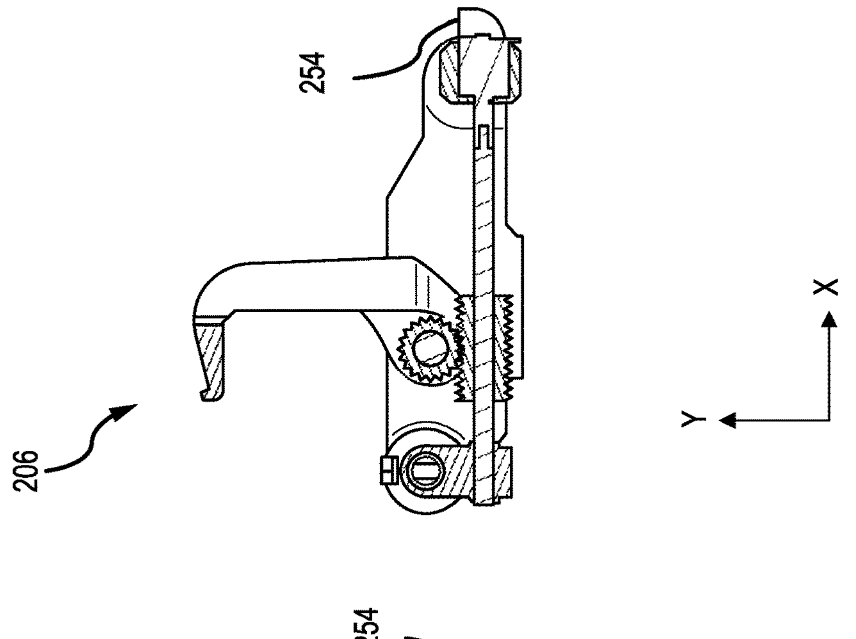
FIGS. 5A, 5B, and 5C illustrate the operating mechanism of a cargo restraining device, in accordance with various embodiments.
Figure 5B:
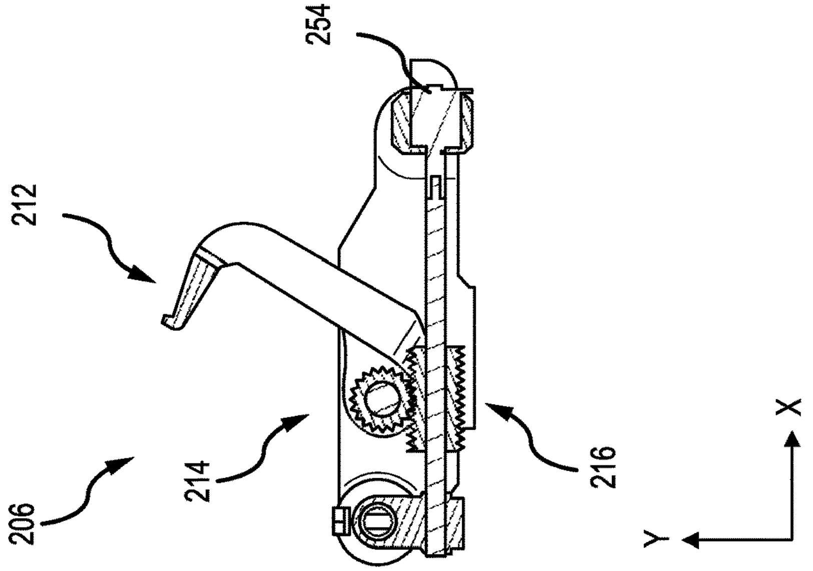
Figure 5A:
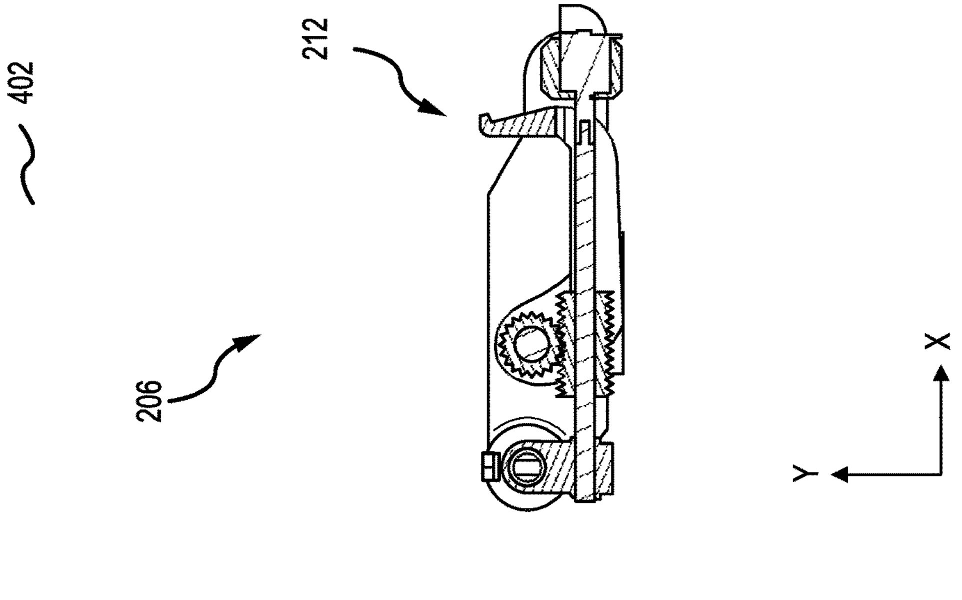

Referring now to FIGS. 5A-5C, in accordance with various embodiments, the different positions of cargo restraining device 206 are illustrated. FIG. 5A is a side view of cargo restraining device 206 in a closed, or retracted, position. FIG. 5B is a side view of cargo restraining device 206 in transition from the closed position to an open position. FIG. 5C is a side view of cargo restraining device 206 in the open, or extended, position.

Cargo restraining device 206 is stored in the closed position as seen in FIG. 5A. head cam gear assembly 214 engages worm shaft assembly 216 preventing restraint head 212 from rotating past horizontal (e.g., the X plane). A controller may be used to engage cargo restraining device 206.

Cargo restraining device 206 rotates, as seen in FIG. 5B, from the closed position to the open position. Motor 254 rotates (e.g., counterclockwise about the X axis) to rotate worm shaft assembly 216, and more specifically to rotate worm gear 232 (e.g., about the X axis). The rotation of worm gear 232 is transferred to cam gear 222 of head cam gear assembly 214. The rotation of head cam gear assembly 214 drives restraint head assembly 210 (e.g., the counterclockwise direction about the Z axis). In various embodiments, motor 254 may be controlled individually by an operator. In various embodiments, motor 254 may be connected to a controller to be operated independently or together with other cargo restraining devices 206. In various embodiments, the connection may be a wired connection. In various embodiments, the connection may be a wireless connection.

Cargo restraining device 206 locks into the raised position, as seen in FIG. 5C, when motor 254 stops rotating. In various embodiments, the controller may be programmed to run motor 254 for a specified period of time. In various embodiments, the controller may be programmed to count the number of rotations of motor 254. In the raised position, cam gear 222 engages worm gear 232 preventing restraint head assembly 210 from rotating (e.g., clockwise) to the lowered position. In various embodiments, the is accomplished by cam gear 222 and worm gear 232 being in a right-hand worm arrangement. In various embodiments, motor 254 may be locked, preventing rotation of worm gear 232 and by extension cam gear 222 and restraint head assembly 210.

To return cargo restraining device 206 to the lowered position, motor 254 rotates (e.g., clockwise about the X axis) rotating worm shaft assembly 216. The rotation of worm shaft assembly 216 is transferred to cam gear 222 of head cam gear assembly 214, rotating restraint head assembly 210 to the lowered position. Motor 254 stops rotation upon restraint head assembly 210 reaching the lowered position. In various embodiments, the number of rotations of motor 254 may be precalculated and programmed into the controller.

Figure 6:
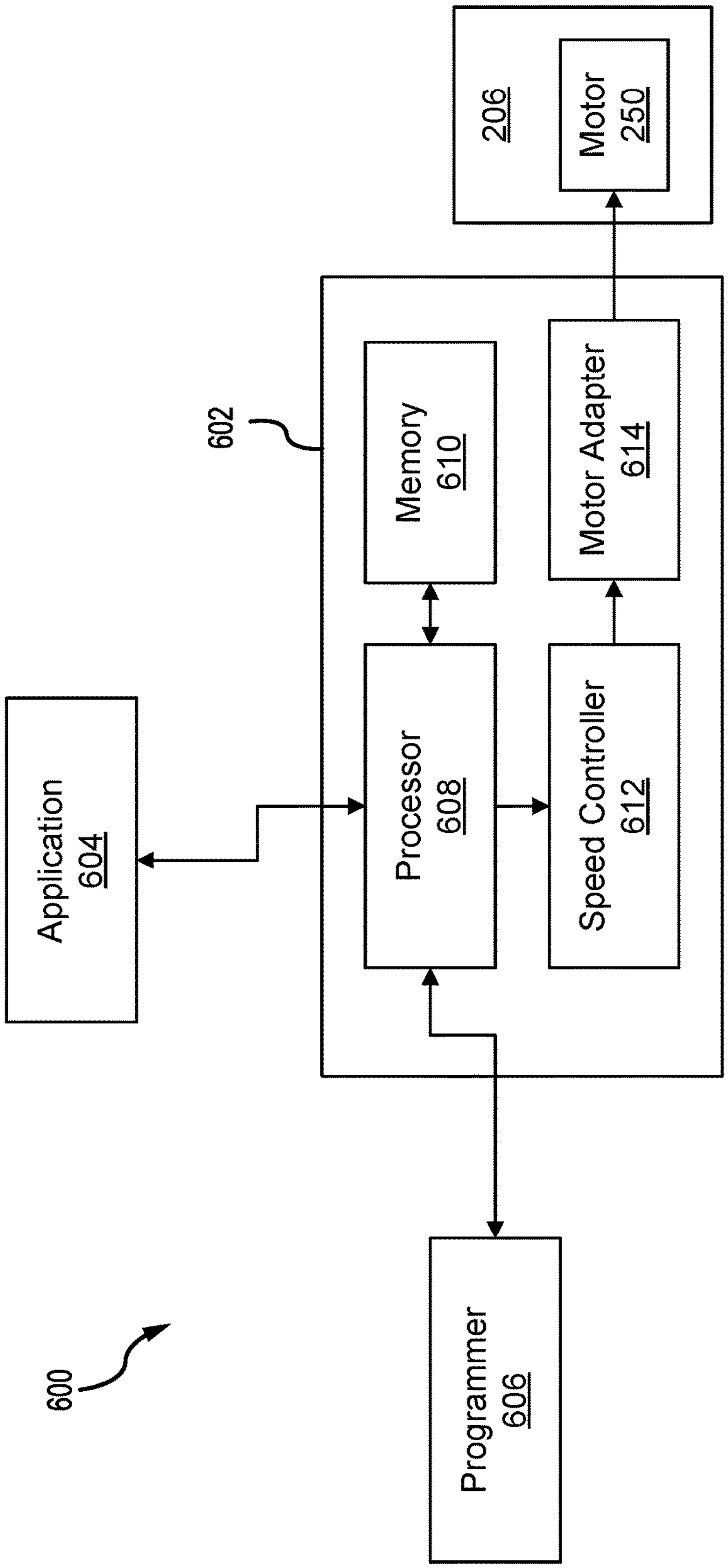
FIG. 6 illustrates a system for controlling a cargo restraining device, in accordance with various embodiments.

Referring now to FIG. 6, a system 600 for controlling cargo restraining device 206, and more specifically, motor 254 is illustrated, in accordance with various embodiments. System 600 includes a controller 602, an application 604, a programming device 606 (e.g., computer, programmer hardware, etc.), and one or more cargo restraining devices 206, each including a motor 254. In various embodiments, application 604 may be used by an operator to control one or more cargo restraining devices 206. In various embodiments, application 604 may be used by another application to control one or more cargo restraining devices 206. Programmer 606 may be used to program and configure controller 602 to operate each cargo restraining device 206. In various embodiments, each cargo restraining device 206 may be configured differently, such as for example, different sized motors, different gear ratios, among others.

Controller 602 may include a processor 608, a memory 610, a speed controller 612, and a motor adapter 614. Processor 608 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Memory 610 may comprise memory to store data, executable instructions, system program instructions, and/or controller instructions to implement the control logic of controller 602, and more specifically, processor 608.

Speed controller 612 may receive instructions from processor 608 to control the operating speed of motor 254. The operating speed may be controlled by varying the voltage and/or current applied to motor 254. In various embodiments, speed controller 612 may be programed, via processor 608, by programmer 606. In various embodiments, speed controller 612 may be controlled by processor 608.

Motor adapter 614 may be used to control motor 254, in accordance with various embodiments. In various embodiments, motor adapter 614 may include programming and/or encoding used to communicate control information to motor 254. Examples of control information include number of rotations, speed information, or feedback from motor 254, among others.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system, comprising:

a ball panel for moving and storing cargo; and a cargo restraining device disposed within the ball panel, the cargo restraining device including:

- a base;
- a restraint head having a gear assembly and secured to the base by a shaft coupled to the gear assembly;
- a motor coupled to the base;
- a worm gear assembly coupled to the motor and the gear assembly, the worm gear assembly configured to engage the gear assembly to extend and retract the restraint head;
- a motor shaft assembly coupled to the base, wherein the motor is coupled to the motor shaft assembly; and
- a shaft coupler, a first end of the shaft coupler coupled to the motor and a second end of the shaft coupler coupled to the worm gear assembly.

2. The cargo handling system of claim 1, the cargo restraining device further comprising:

a lock pin assembly coupled to the base, wherein a first end of the worm gear assembly is coupled to the lock pin assembly and a second end of the worm gear assembly is coupled to the motor.

3. The cargo handling system of claim 1, wherein the worm gear assembly includes a worm gear and a shaft, the gear assembly to the worm gear ratio being between 1:20 and 1:300.

4. The cargo handling system of claim 1, further comprising:

a controller configured to control a rotation of the motor.

5. The cargo handling system of claim 1, wherein the restraint head extends in response to the motor rotating counterclockwise and the restraint head retracts in response to the motor rotating clockwise.

6. The cargo handling system of claim 1, wherein the worm gear assembly includes:

a drive shaft having a first end and a second end;

a worm gear coupled to the drive shaft between the first end and the second end; and a D coupling at the second end of the drive shaft, the D coupling configured to be engaged by the motor.

7. The cargo handling system of claim 1, wherein the gear assembly and the worm gear assembly are configured to be right-hand worm arrangement.

8. A cargo restraining device, comprising:

a base;

a restraint head having a gear assembly and secured to the base by a shaft coupled to the gear assembly;

a motor coupled to the base;

a worm gear assembly coupled to the motor and the gear assembly, the worm gear assembly configured to engage the gear assembly to extend and retract the restraint head;

a motor shaft assembly coupled to the base, wherein the motor is coupled to the motor shaft assembly; and a shaft coupler, a first end of the shaft coupler coupled to the motor and a second end of the shaft coupler coupled to the worm gear assembly.

9. The cargo restraining device of claim 8, further comprising:

a lock pin assembly coupled to the base, wherein a first end of the worm gear assembly is coupled to the lock pin assembly and a second end of the worm gear assembly is coupled to the motor.

10. The cargo restraining device of claim 8, wherein the worm gear assembly includes a worm gear and a shaft, the gear assembly to the worm gear ratio being between 1:50 and 1:250.

11. The cargo restraining device of claim 8, wherein the motor is configured to be controlled by a controller.

12. The cargo restraining device of claim 8, wherein the restraint head extends in response to the motor rotating counterclockwise and the restraint head retracts in response to the motor rotating clockwise.

13. The cargo restraining device of claim 8, wherein the worm gear assembly includes:

a drive shaft having a first end and a second end;

a worm gear coupled to the drive shaft between the first end and the second end; and a D coupling at the second end of the drive shaft, the D coupling configured to be engaged by the motor.

14. A cargo restraining device, comprising:

a base;

a restraint head having a gear assembly and secured to the base by a shaft coupled to the gear assembly;

a motor coupled to the base;

a worm gear assembly coupled to the motor and the gear assembly, the worm gear assembly configured to engage the gear assembly to extend and retract the restraint head; and a lock pin assembly coupled to the base, wherein a first end of the worm gear assembly is coupled to the lock pin assembly and a second end of the worm gear assembly is coupled to the motor.

15. The cargo restraining device of claim 14, wherein the worm gear assembly includes:

a drive shaft having a first end and a second end;

a worm gear coupled to the drive shaft between the first end and the second end; and a D coupling at the second end of the drive shaft, the D coupling configured to be engaged by the motor.

* * * * *